United States Patent [19]

Bauman et al.

[11] Patent Number: 5,915,128
[45] Date of Patent: Jun. 22, 1999

[54] SERIAL SPEED-MATCHING BUFFER UTILIZING PLURALITY OF REGISTERS WHERE EACH REGISTER SELECTIVELY RECEIVES DATA FROM TRANSFERRING UNITS OR SEQUENTIALLY TRANSFERS DATA TO ANOTHER REGISTER

[75] Inventors: Mitchell Anthony Bauman, Circle Pines; James Louis Federici, Shoreview, both of Minn.

[73] Assignee: Unisys Corporation, Blue Bell, Pa.

[21] Appl. No.: 08/789,904

[22] Filed: Jan. 29, 1997

[51] Int. Cl.$^6$ ...................................................... G06F 13/00
[52] U.S. Cl. ........................ 395/880; 395/849; 395/872; 395/873; 395/891
[58] Field of Search ............................... 326/40; 395/289, 395/500, 750.01, 849, 872, 873, 880, 891; 711/5

[56] References Cited

U.S. PATENT DOCUMENTS

| | | | |
|---|---|---|---|
| 5,278,967 | 1/1994 | Curran | 711/5 |
| 5,287,531 | 2/1994 | Rogers, Jr. et al. | 395/289 |
| 5,353,404 | 10/1994 | Abe et al. | 345/508 |
| 5,752,047 | 5/1998 | Darty et al. | 395/750.01 |
| 5,764,952 | 6/1998 | Hill | 395/500 |
| 5,781,234 | 7/1998 | David et al. | 348/319 |
| 5,786,710 | 7/1998 | Graf | 326/40 |

*Primary Examiner*—Thomas C. Lee
*Assistant Examiner*—Chien Yuan
*Attorney, Agent, or Firm*—Beth L. McMahon; Charles A. Johnson; Mark T. Starr

[57] ABSTRACT

A serial speed-matching buffer for transferring data signals between a selectable one of multiple transferring units to one or more receiving units. The serial speed-matching buffer has a plurality of registers which may each be selectably configured in load mode to receive data signals from selectable ones of the transferring units. Data signals provided to the speed-matching buffer from a selectable one of the transferring units may be made available to the receiving unit during the next clock period. This is an improvement over a rank-of-registers speed-matching buffer which generally inflicts a delay prior to the first word of any transfer. When not conditioned in load mode, each of the registers defaults to a serial chain mode in which data signals may be received from an associated adjacent one of the registers, and wherein a predetermined one of the registers provides data signals at the receiving rate. Any register not containing valid buffered data signals is available to receive data signals from a transferring unit, thereby resulting in a design which requires fewer registers. Because the registers default to a serial chain mode when not receiving data from a selectable one of the transferring units, control logic for the buffer is simplified.

17 Claims, 11 Drawing Sheets

SERIAL SPEED-MATCHING BUFFER UTILIZING PLURALITY OF REGISTERS WHERE EACH REGISTER SELECTIVELY RECEIVES DATA FROM TRANSFERRING UNITS OR SEQUENTIALLY TRANSFERS DATA TO ANOTHER REGISTER

BACKGROUND

1. Field of the Invention

This invention relates to a speed-matching buffer used to transfer digital signals between two units having different transfer rates; and, more particularly, to a serial speed-matching buffer capable of transferring signals from any one of a plurality of transferring units to one or more receiving units wherein certain ones of the transferring units have different transfer rates from each other and from the receiving units, the transfer being completed with a minimal associated delay and using a minimal number of logic gates.

2. Description of the Prior Art

In complex data processing systems, multiple units having different clock speeds from one another must communicate across interfaces of varying widths, that is, having different numbers of binary digits (bits) transferred in parallel. As a result, a particular receiving unit may receiving data signals from a variety of different transferring units at a number of different transfer rates, none of which matches the rate at which the receiving unit is capable of receiving the data. To remedy this problem, speed-matching buffers are often utilized.

A speed-matching buffer is a storage device that provides an interface between transferring and receiving units that have different transferring and receiving rates, respectively. To avoid an overrun situation, the buffer must be large enough to receive data signals from the unit having the highest transfer rate; and, in turn, provide those data signals to the unit having the lowest receiving rate.

Some prior art speed-matching buffers have been implemented using dual-ported random access memory devices (RAMs). A first unit stores data signals into one or more RAMs at predetermined memory locations, and a second receiving unit later reads the data signals from the same predetermined locations in the RAMs. Although this implementation provides a relatively large amount of buffer space, it is not very fast. Transferring and receiving units can not access the RAMs simultaneously, which slows down throughput. In addition, RAMs that are external to other interfacing logic that is implemented within an application-specific integrated circuit (ASIC) have relatively long "off-chip" access times. Alternatively, memory devices embedded within an ASIC design are faster, but consume a large amount of circuits and silicon area to implement. Finally, dual-ported memories require relatively complex control logic circuits to implement, Instead of using RAMs, many logic designers calculate the worst-case buffer size, then implement the buffer using state devices such as registers. Generally such state devices will have multiple ranks of registers, wherein each rank of registers receives data approximately simultaneously from another rank of registers. Each rank is usually capable of receiving data signals from the unit having the widest interface. On each active portion of the clock signal associated with the transferring unit, data signals are captured from the transferring unit into a first rank of registers, any previously received data signals from the first rank of registers are transferred to a second rank of registers, and so on. The buffer must contain enough ranks of registers to buffer data signals during a transfer between the unit having the highest transfer rate and the unit having the lowest transfer rate or a data overrun could result. Overrun causes loss of data and is unacceptable in most operations.

A speed-matching buffer implemented using ranks of registers is generally faster than RAM-based designs, both because the sending and receiving units may access the buffer simultaneously, and because state devices such as registers generally have faster access times than RAMs. On the other hand, buffers implemented using ranks of registers often produce unwanted delays between the sender and receiver because the first word or words of the transfer may have to be clocked through multiple ranks of the buffer before they can be received by the receiving unit. In addition, as mentioned above, the buffer must contain enough ranks of registers to handle the worst-case scenario, and all ranks of registers are generally designed to receive data from the unit having the widest interface. As a result, many registers in the buffer are not needed during many transfers, and circuits and silicon area are unnecessarily wasted. Finally, the control logic associated with this rank-of-registers design can be relatively complex because control logic sequences are needed to gate the data from the last rank of registers to the receiving unit in increments that match the width of the receiving unit's data path. The control logic sequences will vary based on the width of the transferring unit's data path.

OBJECTS

It is the primary object of the invention to provide an improved speed-matching buffer that receives data signals from a selectable one of a plurality of transferring devices at a first transferring rate and provides the data signals to a receiving device at a second receiving rate which is different from that of the first transferring rate, and the transfer is completed with the minimum possible delay It is still another object of the invention to provide an improved speed-matching buffer that receives data signals from a selectable one of a plurality of transferring devices across an associated interface, and provides the data signals to a receiving unit across an interface having a width of parallel data signals which differs from that of the associated interface, and the transfer is completed without the use of control sequences that are dependent on the width of the associated interface;

It is another object of the invention to provide an improved speed-matching buffer that receives data signals from a selectable one of a plurality of transferring devices across an associated interface, and provides the data signals to a receiving unit across an interface having a different width from the associated interface so that the transfer is completed with the minimum delay;

It is yet another object of the invention to provide an improved speed-matching buffer that completes a transfer of data signals between a first transferring device having a first transferring rate and a second receiving device having a second receiving rate slower than the first transferring rate without the use of multiple ranks of storage devices; and It is a further object of the invention to provide an improved speed-matching buffer that receives data signals during one or more parallel load operations from a selectable one of a plurality of transferring devices having a first transfer rate, and that provides the data signals using a serial shift operation to a second receiving device at a second receiving rate which is different from the first transfer rate.

SUMMARY OF THE INVENTION

The objectives of the present invention are achieved in a serial speed-matching buffer. The buffer receives data signals from one of a plurality of transferring units and provides the data signals to one or more receiving units. One or more of the transferring units have a data transfer rate which is different from other ones of the transferring units, and which may be different from the transfer rate of the receiving unit. Furthermore, one or more of the transferring units provides data signals to the buffer over a data path which has a different number of parallel data bits, that is, a different width, from the width of the data paths of other transferring units. One or more of the transferring units also has a data path which has a different width from the width of the data paths of the one or more receiving units.

The serial speed-matching buffer contains a single rank of registers. The registers are coupled in a chain configuration in which each register (except the last register in the chain) is capable of receiving, in parallel, the data signals from an adjacent register in the chain. Each of the registers is further capable of receiving, in parallel, data signals from a selectable one of a plurality of transferring units. The first one or more registers in the chain are also capable of providing, in parallel, data signals to the one or more receiving units.

During a transfer operation, predetermined ones of the registers including the first register, receive data signals from a selectable one of the transferring units during a first parallel load operation. The number of data signals received is determined by the width of the transferring unit's data path. The loaded data signals are immediately provided from the one or more first registers in the chain across a parallel data path which is as wide as the receiving unit's data path. If more data signals are still available to be transferred to the receiving unit after the first transfer is completed, the registers in the chain are put into a serial shift mode wherein each register performs a parallel load operation of the data from the adjacent register in the chain. The data signals received by the first register are again provided to the receiving unit. In this manner, the data signals are shifted up the chain from one register to the next and finally passed to the receiving unit at the receiving unit's transfer rate.

If the transfer operation requires multiple parallel load operations from the selected one of the transferring units, the additional load operations are performed to those registers in the chain which no longer contain data signals from a previous parallel load operation. Data from the subsequent load operations are provided to the receiving unit in the same serial-shift manner described above.

The current serial speed-matching buffer includes a single rank of registers between the transferring and the receiving unit, so that data signals are available to the receiving unit as soon as they are latched into the chain of registers. The receiving unit does not have to wait for the first data signals of the transfer to be clocked through various ranks of registers before they become available, as is the case with prior art designs using ranks of registers. This improves system throughput.

In addition, the serial speed-matching buffer contains fewer registers than buffers implemented using multiple ranks of registers. Buffers containing multiple ranks of registers are generally designed such that each rank is as wide as the widest associated data path. If the transferring unit's data path is wider than the receiving unit's data path, data signals are provided from the last rank of registers to the receiving unit during multiple transfers. When all data signals from the last rank of registers have been provided to the receiving unit, the entire rank receives the next data signals to be provided to the receiving unit. As a result, multiple registers within the first rank may be standing idle waiting for the transfer of data signals from the first rank to complete. The current serial speed-matching buffer eliminates this problem by using a serial chain configuration. As soon as a register in the serial chain no longer contains signals which will be involved in a future transfer, that register becomes available to receive further data signals from the transferring unit. Thus fewer registers are needed in the current serial speed-matching buffer system, and the system can be implemented using fewer circuits.

Finally, the control logic associated with the serial speed-matching buffer is less complicated than that associated with the rank-of-registers buffer scheme. In the prior art system, buffers which receive data signals from a transferring unit having a wider data path than the receiving unit's data path use control sequences to gate the data signals from the buffer onto the receiving unit's data path. The control sequences are unique based on the width of the transferring unit's data path. In contrast, the current system does not require control sequences to gate data signals from the buffer to the receiving unit. The receiving unit always receives data signals from the same one or more registers in the register chain. Moreover, the control logic associated with each register in the chain is relatively simple: unless a register receives a load pulse which selects a parallel load from a selectable one of the transferring units, each register defaults to a serial mode wherein data signals are received from an adjacent register in the chain. Because the control logic is relatively simple, it may be implemented using fewer circuits.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DESCRIPTION OF THE PREFERRED EMBODIMENT

A. System Environment

Figures 1, 1A:
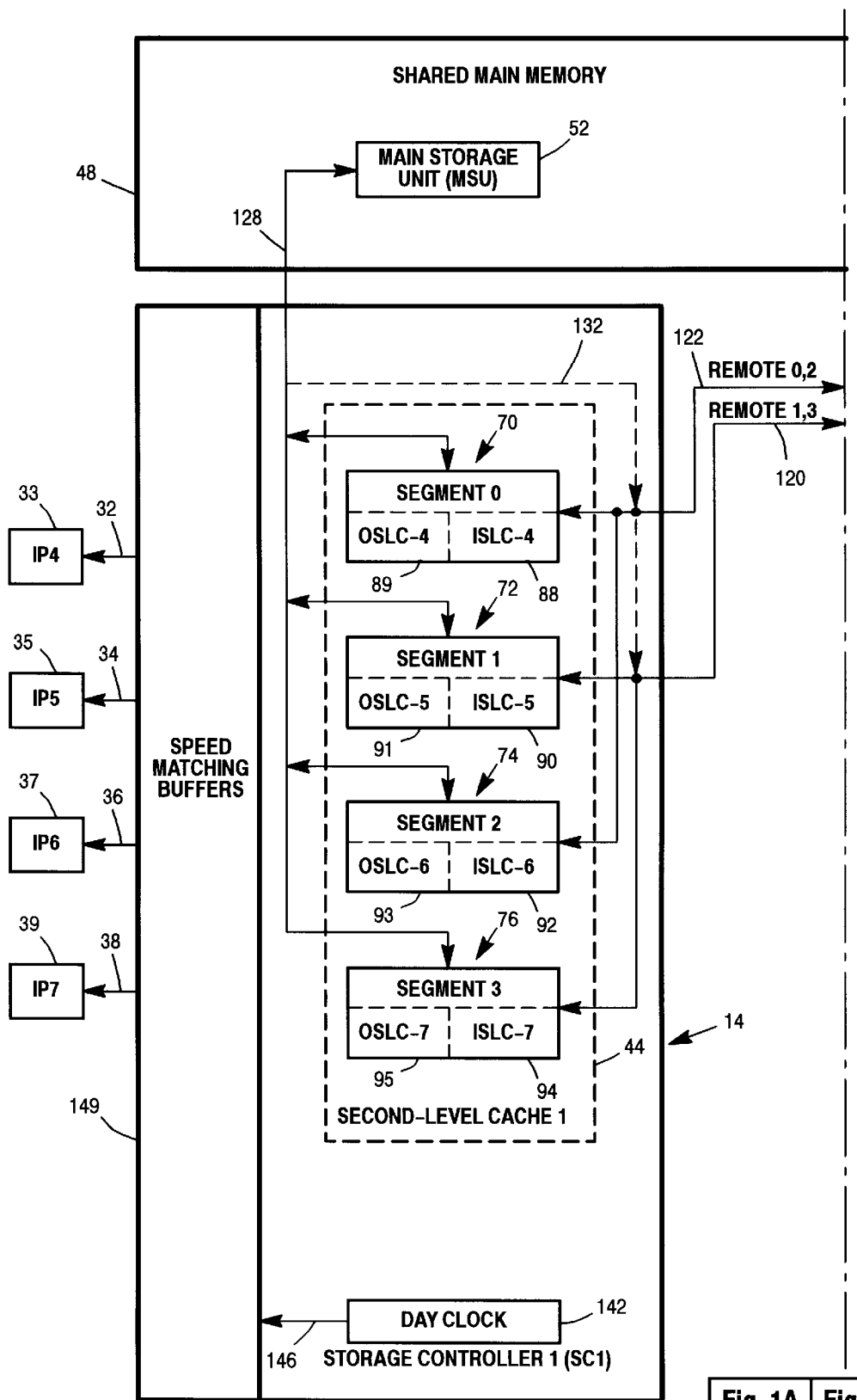
FIG. 1A and 1B, when arranged as shown in FIG. 1, are a block diagram of the multiprocessor data processing system in which the present invention is embodied.
Figure 1B:
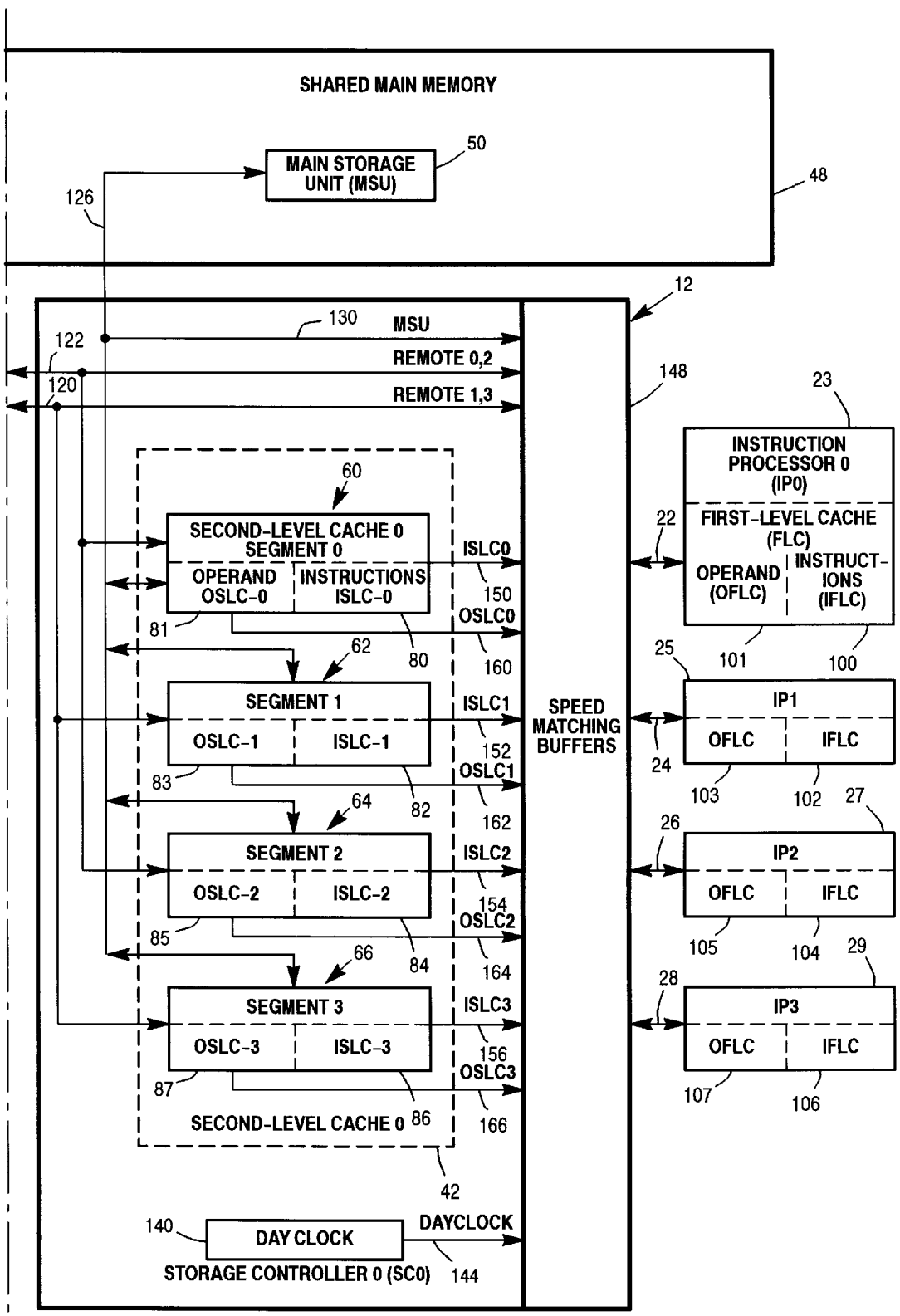

FIG. 1A and 1B, when arranged as shown in FIG. 1, are a block diagram of the multiprocessor data processing system in which the present invention is embodied. The system of FIG. 1 has two storage controllers, SC0 labeled 12 and SC1 labeled 14. Each of the storage controllers is coupled to four instruction processors (IPs). Lines 22, 24, 26, and 28 illustrate the respective point-to-point couplings between the instruction processors IP0 23, IP1 25, IP2 27, IP3 29 and SC0 12. Lines 22, 24, 26, and 28 represent the collection of control, data, and address lines between the IPs and the SC0 12. Lines 32, 34, 36, and 38 represent similar couplings between SC1 14 and IP4 33, IP5 35, IP6 37, and IP7 39, respectively.

Each of the storage controllers SC0 12 and SC1 14 has a global second-level cache SLC0 labeled 42, and SLC1 labeled 44, respectively. The global SLCs are described as "global" because each is mapable to the all of system's addressable memory included in shared main memory 48. That is, the entire address range of the addressable memory is cacheable by each of the global SLCs. The shared main memory 48 is comprised of two memory subsystems, memory storage units (MSUs) 50 and 52.

SC0 12 and global SLC 42 are "local" relative to IP0 23, IP1 25, IP2 27, and IP3 29, and are "remote" relative to IP4 33, IP5 35, IP6 37, and IP7 39. Similarly, storage controller 14 and global SLC 44 are "local" relative to IP4 33, IP5 35, IP6 37, and IP7 39, and are "remote" relative to IP0 23, IP1 25, IP2 27, and IP3 29. The global SLCs may be viewed as dedicated to the requests of their respective local IPs and cooperating in servicing requests from the remote IPs. Global SLC 42 is dedicated to IP0 23, IP1 25, IP2 27, and IP3 29 in that the SLC storage is dedicated to caching data based on requests from IP0, IP1, IP2, and IP3. Similarly, global SLC 44 is dedicated to IP4 33, IP5 35, IP6 37, and IP7 39 in that the SLC storage is dedicated to caching data based on requests from IP4, IP5, IP6, and IP7.

Each of the SLCs 42 and 44 is comprised of four independently controlled second-level cache memory segments referred to as segment 0, segment 1, segment 2, and segment 3. These segments are shown as segment 0 60, segment 1 62, segment 2 64 and segment 3 66, respectively, in SLC0 42, and as segment 0 70, segment 1 72, segment 2 74 and segment 3 76, respectively, in SLC1 44. Generally, each of segment 0, segment 1, segment 2, and segment 3 maps to one-fourth of the shared main memory 48 and has a respective, dedicated instruction second-level cache (ISLC) for caching instructions and a dedicated second-level cache (OSLC) primarily for caching operands. The dedicated instruction caches ISLC-0, ISLC-1, ISLC-2, ISLC-3, ISLC-4, ISLC-5, ISLC-6, and ISLC-7 are labeled 80, 82, 84, 86, 88, 90, 92, and 94, respectively, and correspond to the segments labeled 60, 62, 64, 66, 70, 72, 74, and 76, respectively. The dedicated operand caches OSLC-0, OSLC-1, OSLC-2, OSLC-3, OSLC-4, OSLC-5, OSLC-6, and OSLC-7 are labeled 81, 83, 85, 87, 89, 91, 93, and 95, respectively, and correspond to segments labeled 60, 62, 64, 66, 70, 72, 74, and 76, respectively.

In addition to the second-level caches SLC0 42 and SLC1 44, the multi-processor system of FIG. 1 also includes dedicated first-level caches (FLCs) associated with each of the instruction processors. Each of the FLCs includes a dedicated operand and a dedicated instruction FLC cache. Instruction FLCs (IFLCs) labeled 100, 102, 104, and 106 are associated with IPs 23, 25, 27, and 29, respectively. Operand FLCs (OFLCs) labeled 101, 103, 105, and 107 are associated with IPs 23, 25, 27, and 29, respectively. Similar FLC caches (not shown) are associated with IPs 33, 35, 37, and 39.

During execution, an IP will generally attempt to retrieve an instruction or operand from its associated first-level instruction or operand caches, respectively. If the attempted instruction or operand fetch results in a first-level cache miss, a request is made across the associated control, data and address lines to the IP's local SC, where the request is presented to both the instruction and operand second-level cache so that the appropriate cache can retrieve the data signals. The request will be presented to the appropriate local SLC segment based on the request address. As discussed above, each segment maps to one-fourth of the shared main memory 48.

If the request results in a second-level cache hit, the instruction or operand will be presented to the instruction processor in a manner discussed further below. If the request results in a local second-level cache miss, the local SC forwards the request to the remote SC across one of two remote interfaces. Requests from segments 0 and 2 share a remote interface, and requests from segments 1 and 3 share a remote interface. Logic circuits in the remote SC provide the request to the appropriate remote cache (instruction or operand) within the appropriate remote segment based on the request address. If the request results in a remote cache hit in the remote SC, the requested instruction or operand is returned to the local SC and copied into the respective local cache segment so it is available to the requesting processor for future use. The requested instruction or operand is also transferred to the requesting IP in a manner described further below.

If a request to a remote segment results in a remote cache miss, the request is presented to one of the MSUs 50 or 52 as determined by the request address. The requested instruction or operand will be retrieved from the appropriate MSU and stored in the associated local SLC segment, and is also presented to the requesting IP in a manner which will be discussed below.

The above description can be illustrated by the following example. Assume the IP0 23 executes an instruction that references an operand. The IP attempts to retrieve the operand from the OFLC 101, but the request results in a cache miss. The request address is therefore transferred across the interface on line 22 to the SC 12 where it will be directed to the appropriate local segment. Assume that the request address maps to the local OSLC-1 83. If the request results in a hit, the requested operand is transferred back to IP0 23 in a manner discussed below and the operand will be cached in the operand FLC 101 of IP0.

If the request instead results in a local cache miss, the request address is transferred to the remote SC1 14 across one of the remote interfaces. Requests from segments 1 and 3 share the remote 1/3 interface 120, and requests from segments 0 and 2 share the remote 0/2 interface 122. In this example, the request address is transferred across the remote 1/3 interface 102 to SC1 14, where the request is presented to the remote OSLC-5 91. If the request is a hit, the requested operand is returned to local SC0 12 on the remote 1/3 interface 120, where it is stored into local OSLC-1 83. The operand is also transferred to IP0 23 as will be discussed below.

If the request instead results in a remote cache miss to OSLC-5 91, the request address is presented to either MSU 50 across the interface on line 126, or is presented to MSU 52 across the interface on line 128, as determined by the request address. If the request is presented to MSU 50, the operand is returned from MSU 50 across the interface on line 126 and is cached in the local OSLC-1 83. It is also presented to the IP in the manner discussed below. If the request is presented to MSU 52, the retrieved operand is transferred from MSU 52 on the interface on line 128 and provided on line 132 (shown dashed) to the remote 1/3 interface 120 where it is transferred to OSLC-1 83 in SC0 12. The operand is also presented to the IP as will be discussed below.

Each one of the SCs has a dayclock, which is a 54-bit counter/timer that is incremented once every microsecond to provide a two-word timestamp reading necessary for many system tasks including multi-process control. Dayclock 140 is local to SC0 12 and provides the timestamp to associated local IPs using the interface on line 144. Dayclock 142 is local to SC1 14 and provides the timestamp to associated local IPs using the interface shown on line 146.

The foregoing discussion demonstrates that each IP interfaces to a variety of devices including four local instruction caches and four local operand caches. Additionally, each IP is coupled to the shared main memory 48, and to two remote interfaces. Finally, the IP interfaces to the local dayclock.

Most of the devices which interface to the IPs have transfer rates which differ from both the IPs and from the other devices interfacing to the IPs. Furthermore, the interfaces are of varying widths. As a result, speed matching buffers are employed to buffer data signals before they are transferred to the requesting IP. One speed matching buffer is associated with each of the IPs shown in FIG. 1. In FIG. 1, the speed matching buffers associated with each of IP0 23, IP1 25, IP2 27, and IP3 29 are shown collectively as block 148. The speed matching buffers associated with each of IP4 33, IP5 35, IP6 37, and IP7 39 are shown collectively as block 149. Each of the speed matching buffers receives instructions and operands from the various transferring devices, then provides this information to the associated IP at a rate which matches the IP's transfer rate.

In FIG. 1, each of the speed matching buffers shown collectively in block 148 is coupled to each of the local ISLCs labeled 80, 82, 84, and 86 for receiving instructions. The interfaces to ISLCs 80, 82, 84, and 86 are shown on lines labeled 150, 152, 154, and 156, respectively. Each of these interfaces are two-words wide, where a word in the preferred embodiment is 36 bits. Each of the speed matching buffers shown collectively as block 148 is likewise coupled to each of the local OSLCs labeled 81, 83, 85, and 87 for receiving operands. The interfaces to OSLCs 81, 83, 85, and 87 are each four words wide and are shown on lines labeled 160, 162, 164, and 166, respectively. Each of the speed matching buffers shown as block 148 is further coupled to the remote 0/2 interface on line 122, the remote 1/3 interface on line 120, and to the shared main memory 48 on line 130. Each of these interfaces is one-word wide. Each of the speed matching buffers shown collectively as 148 are coupled to the dayclock 140 across a two-word wide interface on line 144. Each of the speed matching buffers further interface to the respective IP 23, 25, 27, or 29 across the one-word-wide data portions of the interfaces shown on lines 22, 24, 26, and 28, respectively. Each of the speed matching buffers shown collectively in block 149 have similar interfaces to those shown and discussed above in reference to the input buffers in block 148.

Figure 2:
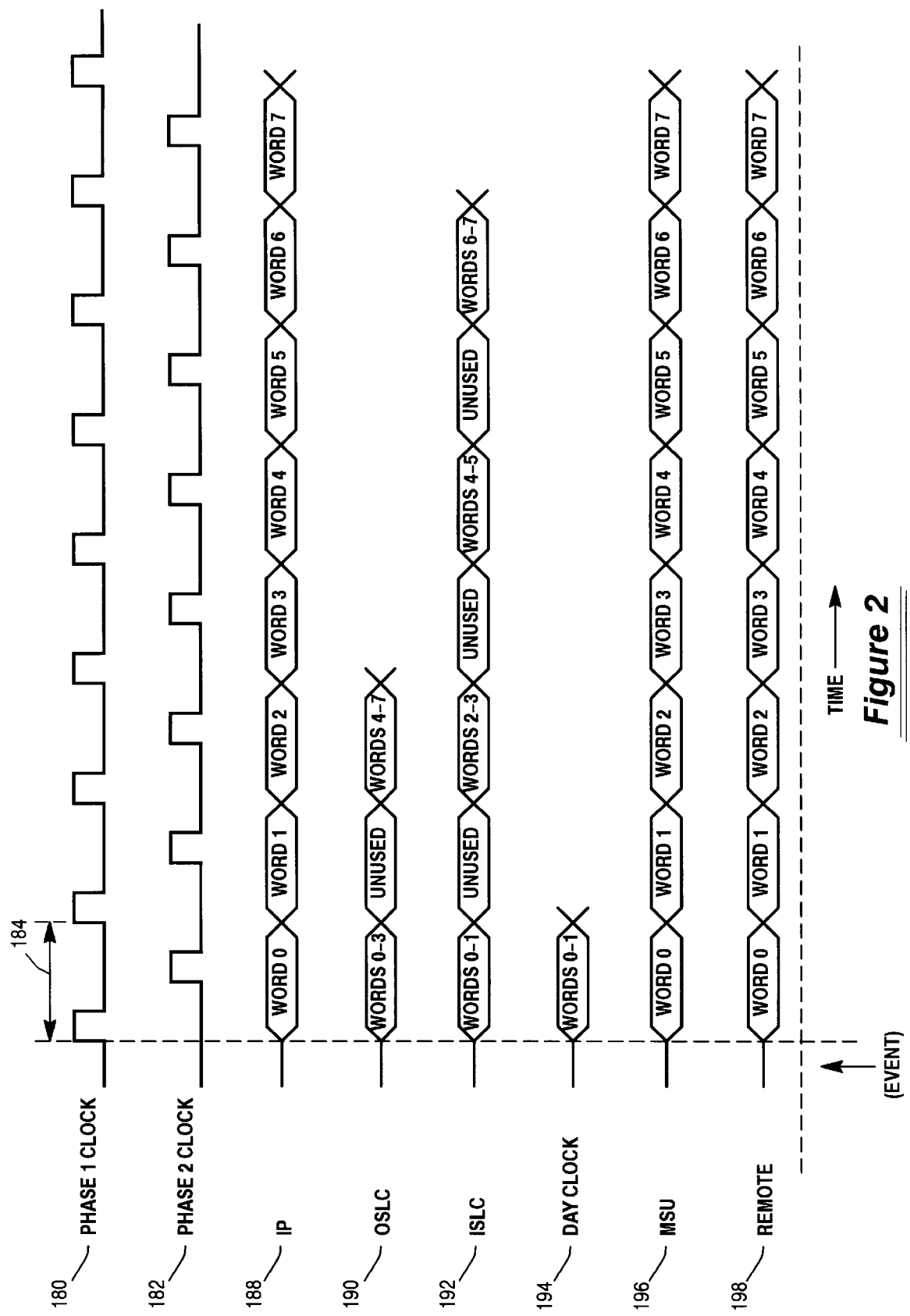
FIG. 2 is a timing diagram showing the transfer rates of the various devices interfacing to the speed-matching buffer in the system of the preferred embodiment.

FIG. 2 is a timing diagram showing the transfer rates of the various devices interfacing to the speed-matching buffer in the system of the preferred embodiment. For purposes of this timing diagram, and for all following discussions, the first word of any transfer is referred to as "word 0", the second word is "word 1", as so on.

This timing diagram includes two clock signals used within the system of the preferred embodiment. The phase 1 clock signal is depicted as waveform 180, and the phase 2 clock signal is shown as waveform 182, each having a period of approximately 11 nanoseconds (ns). A single period of the phase 1 clock signal 180, depicted by arrow 184, is referred to as a clock cycle.

As shown by waveform 188, an IP is capable of receiving one word of data (either instruction or operand) across an associated IP/SC interface at a rate of one word per clock cycle. The associated IP/SC interface has a one-word wide data path.

Waveform 190 shows a single transfer operation from an OSLC segment to an IP. The transfer occurs in eight-word packets. These packets are transferred across a four-word wide OSLC interface to the speed-matching buffer at a rate of four words at a time. The four words are provided on alternating clock cycle s. In other words, four words are provided by the OSLC during a first clock cycle. Then an "unused" clock cycle occurs during which no associated words are transferred. Then on the following clock cycle, the remain four words are provided by the OSLC.

Waveform 192 shows a single transfer of instructions from an ISLC segment to an IP. The transfer occurs in eight-word packets. These packets are transferred across a two-word-wide ISLC interface to the speed-matching buffer at a rate of two words every other clock cycle. In other words, two words are provided by the ISLC during a first clock cycle. Then an unused clock cycle occurs. On the following clock cycle, two more words are provided, and so on. The complete eight-word packet can therefore be transferred to the speed matching buffer in seven clock cycles. The dayclock also transfers a two-word timestamp across a two-word-wide interface to the speed-matching buffer at a rate of two words per clock cycle, as shown by waveform 194. Finally, the MSU and each of the remote SC interfaces transfer instructions and operands to the speed-matching buffer in eight-word packets at a rate of one word per clock cycle, as shown by waveforms 196 and 198, respectively.

B. Description of the Prior Art

Figure 3:
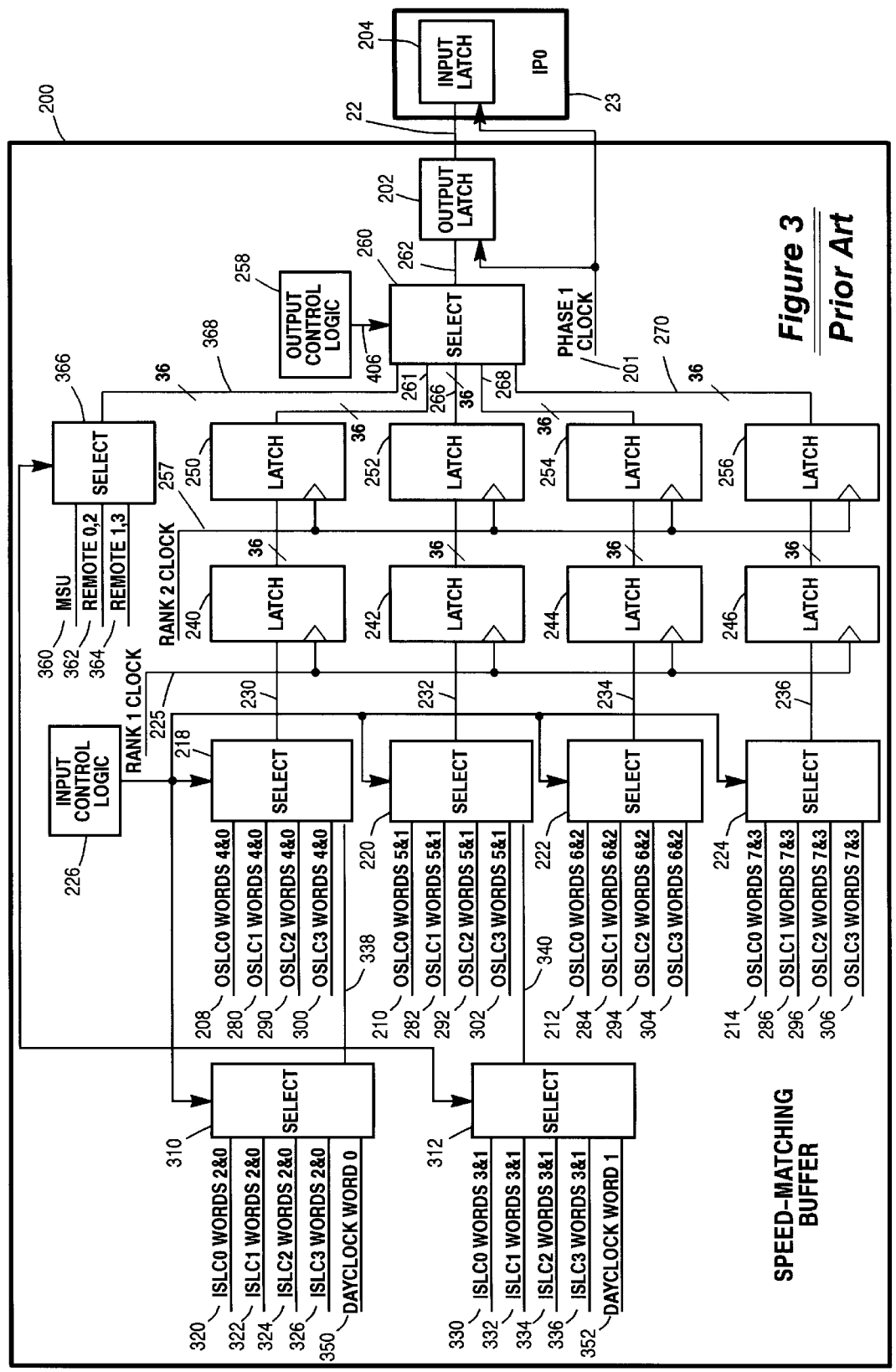
FIG. 3 is a schematic block diagram of the prior art buffer mechanism used to transfer data between the various transferring devices and an instruction processor.

FIG. 3 is a schematic block diagram of a prior art speed-matching buffer used to transfer data between various sending devices and an instruction processor. This circuit can receive instructions and operands from sending devices including OSLCs, ISLCs, MSUs, remote interfaces, and a dayclock. (See FIG. 1) The circuit can be coupled to any one of the IPs shown in FIG. 1. For discussion purposes, the circuit of FIG. 3 is shown coupled to IP0 23.

The prior art buffer circuit 200 uses two ranks of latches to buffer data signals received from the selected sending device so that the transfer rate of the sending device can be matched to the transfer rate of the IP. Multiple selection devices gate words from the sending devices to the two ranks of latches in a manner which is well known in the art. A selected word is ultimately latched into the output latch 202 on the active portion, such as the active edge, of the phase 1 clock signal on line 210 so that it can be provided to input latch 204 of IP0 23. The subsequent active edge of the phase 1 clock signal latches the data into latch 204. In this manner, words are transferred across the data portion of the interface shown on line 22 at IP0's transfer rate of one word per clock cycle.

The operation of the circuit is best explained by example. Assume OSLC-0 81 of FIG. 1 is performing an operand transfer to IP0 23 using the prior art buffer circuit 200 of FIG. 3. Each of the first four words to be transferred in this packet, that is word 0, word 1, word 2, and word 3, will be provided by OSLC-0 81 on the four-word wide interface represented by line 160 to the nets on lines 208, 210, 212, and 214, respectively. These four words are provided to the selection circuits 218, 220, 222, and 224, respectively. Prior to the transfer, input control logic 226 conditions the selection circuits 218, 220, 222, and 224 to select the signals on inputs 208, 210, 212, and 214, respectively, so that the operands from OSLC-0 81 can be provided on lines 230, 232, 234 and 236, respectively. Words 0, 1, 2, and 3 are latched into latches 240, 242, 244, and 246, respectively, on the active edge of the rank 1 clock signal provided on line 225. Latches 240, 242, 244, and 246 are the first rank of latches. The latched signals are further latched into the second rank of latches, which includes latches 250, 252, 254, and 256, on the active edge of the rank 2 clock signal shown on line 257. Output control logic 258 conditions selection circuit 260 to provide word 0 from line 261 to output latch 202 on line 262, where it is loaded on the next active edge of the phase 1 clock signal 180. Word 0 is then driven onto the interface on line 22 to IP0 23 and latched into the IP0 input latch 204 on the next active edge of the phase 1 clock signal provided on line 201.

After word 0 is latched into the output latch 202, the output control logic 258 conditions selection circuit 260 to select word 1 from line 266 so that word 1 is latched into the output latch 202 on the next active edge of the phase 1 clock signal and provided to IP0. The output control logic 258 next conditions selection circuit 260 to select word 2 from line 268 so that word 2 is latched into the output latch 202 on the next active edge of the phase 1 clock signal. During the following clock cycle, selection circuit 260 is conditioned to select word 3 in the same manner. Words 0–3 are therefore transferred to the IP0 23 across interface 22 at a rate of one word per clock cycle.

As discussed above, the OSLC caches have a transfer rate of four words provided on alternate clock cycle. Therefore, two clock cycle s after OSLC-0 provides the first four words of the eight-word operand packet, words 4–7 are likewise provided to the first rank of latches 240, 242, 244, and 246. Words 0–3 are still available in latches 250, 252, 254, and 256, respectively when words 4–7 are latched into latches 240, 242, 244, and 246 respectively. After word 3 is latched into the output latch 202, words 4–7 are transferred from the first rank of latches into the second rank of latches 250, 252, 254, and 256, respectively. The output control logic 258 conditions selection circuit 260 to provide word 4 from the nets shown as line 261 to output latch 202 on the next active edge of the phase 1 clock signal. The sequence is continued for the three remaining words of the transfer, with the output control logic 258 selecting words 5–7 by selecting the nets on lines 266, 268, and 270, respectively, during each of the next three clock cycles.

A similar sequence is performed for a transfer involving any of the other OSLC segments 1, 2, or 3 from FIG. 1. For a transfer from OSLC-1 labeled 83, input control logic 226 conditions selection circuits 218, 220, 222, and 224 to select as inputs the signals provided on lines 280, 282, 284, and 286, respectively. For a transfer from OSLC-2 labeled 85, the selection circuits are instead conditioned to select the signals provided on lines 290, 292, 294, and 296, respectively, and for a transfer from OSLC-3 labeled 87, the selection circuits select the signals on lines 300, 302, 304, and 306, respectively.

During a transfer from an ISLC segment, the sequence of events is somewhat different because the ISLC interface is only two words wide. The input control logic 226 conditions the selection circuits 310 and 312 to select as inputs the first two words of the eight-word packet provided by the ISLC segment involved in the transfer. Selection circuit 310 is conditioned to select word 0 of the transfer on either lines 320, 322, 324, or 326, depending on whether the source of the instruction packet is ISLC-0, ISLC-1, ISLC-2, or ISLC-3, respectively, labeled 80, 82, 84, and 86, respectively, in FIG. 1. Selection circuit 312 is conditioned to select word 1 of the instruction packet on either lines 330, 332, 334, or 336 depending on whether the source of the transfer is ISLC-0 80, ISLC-1 82, ISLC-2 84, or ISLC-3 86, respectively. The selected words are driven by selection circuits 310 and 312 onto nets shown as lines 338 and 340, respectively. Input control logic 226 conditions selection circuits 218 and 220 to select the words on lines 338 and 340, respectively, so they can be latched into latches 240 and 242, respectively, on the active edge of the rank 1 clock signal provided on line 225. These words are further transferred from latches 240 and 242 into latches 250 and 252, respectively, on the active edge of the rank 2 clock signal provided on line 257. Output control logic 258 conditions selection circuit 260 to select word 0 from latch 250. Word 0 is then latched into output latch 202 on the next active edge of the phase 1 clock signal on line 201. During the next clock cycle, output control logic 258 next conditions selection circuit 260 to select word 1 from latch 252 While words 0 and 1 are being transferred to the IP0 23, words 2 and 3 of the instruction packet are latched into latches 240 and 242, respectively. After word 1 is transferred from latch 252 into output latch 202, words 2 and 3 are latched into the rank 2 latches 250 and 252, respectively, by the active edge of the rank 2 clock signal on line 257. Following the clock cycle during which word 1 is selected by selection circuit 260, output control logic 258 conditions selection circuit 260 to select word 2 from latch 250 to be latched into output latch 202. The following clock cycle, word 3 is selected from latch 252 to be latched into output latch 202. This process is repeated until all eight words of the instruction packet are presented to IP0 23 at the rate of one word per clock cycle.

The circuit operates in a similar manner for words 0 and 1 of the dayclock timestamp, which is presented to selection circuits 310 and 312 on lines 350 and 352, respectively. Words 0 and 1 are selected by selection circuits 218 and 220 and latched by latches 240 and 242 on the active edge of the rank 1 clock signal on line 225. Words 0 and 1 are transferred to latches 250 and 252, respectively, on the active edge of the rank 2 clock signal on line 257. Word 0 is selected by selection circuit 260, latched into output latch 202, and transferred to IP0 23 during the next clock cycle. On the subsequent clock cycle, word 1 is selected from latch 252 and provided to IP0 23 in a similar manner.

Finally, during transfers from either the shared main memory 48, remote 0/2 interface 122, or remote 1/3 interface 120 of FIG. 1, the appropriate data signals from the one-word-wide interface is selected from lines 360, 362, or 364, respectively, by selection circuit 366 and presented to selection circuit 260 on line 368. Selection circuit 260 further selects the signals on line 368 so that they may be latched in output latch 202 to be transferred to the IP. Since operands and instructions are supplied from the shared main memory 48, remote 0/2 interface 122, or remote 1/3 interface 120 at the rate of one word per clock cycle, the data may be supplied to the IP as it is received from the providing unit, and no added buffering is needed.

Figure 4:
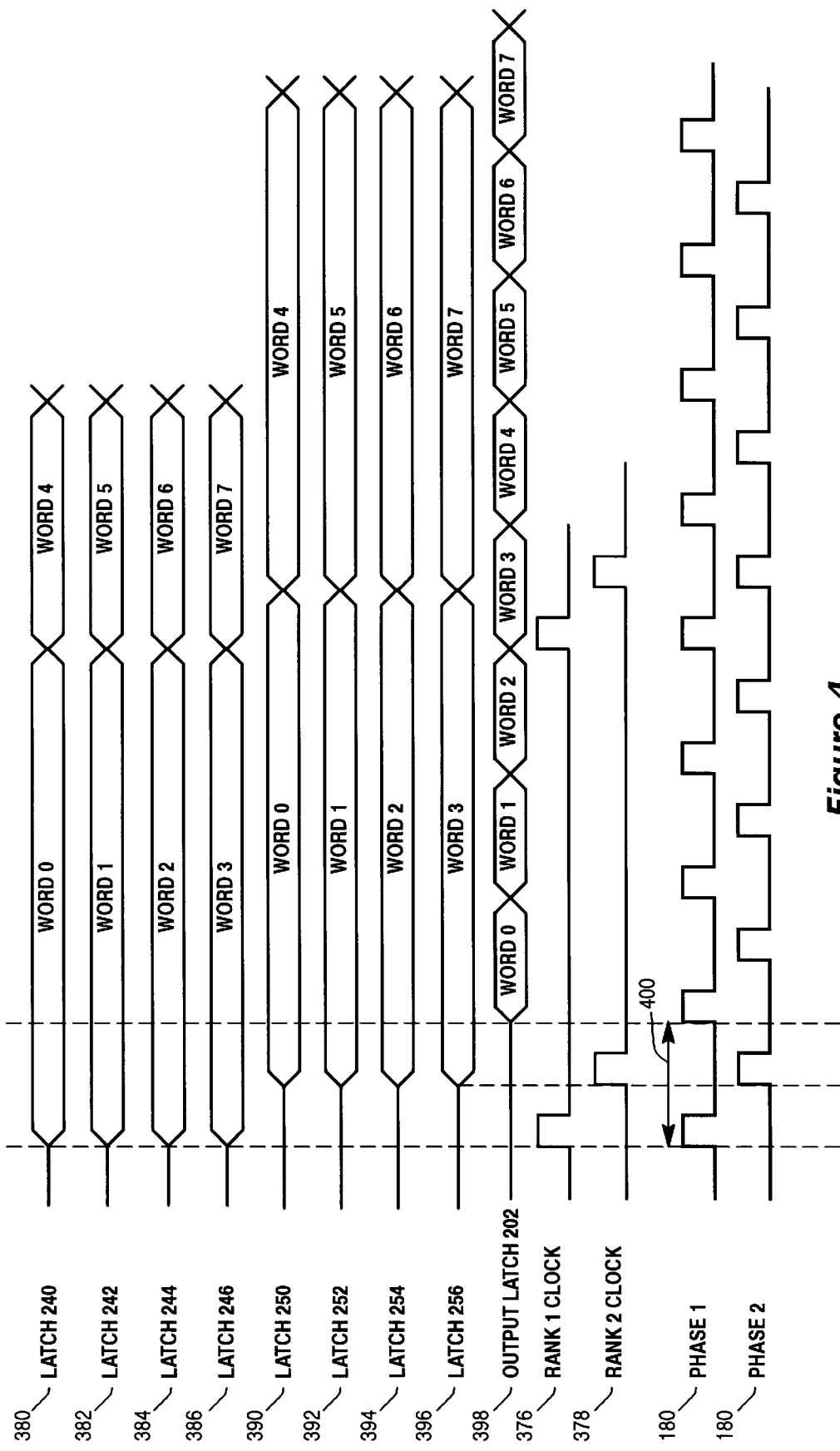
FIG. 4 is a timing diagram of an eight-word operand transfer from an operand second level cache segment using the prior art speed-matching buffer.

FIG. 4 is a timing diagram of an eight-word operand transfer from an OSLC segment using the buffer circuit 200 of the prior art as discussed above in reference to FIG. 3. Waveforms 376 and 378 represent the rank 1 and rank 2 clock signals provided as lines 225 and 257, respectively, of FIG. 3. During an operand transfer, words 0–3 are latched into latches 240, 242, 244, and 246, respectively, by the active edge of the rank 1 clock signal as shown by waveforms 380, 382, 384, and 386, respectively. The rank 1 clock signal is approximately synchronized with the phase 1 clock signal shown as waveform 180 of FIGS. 2 and 4. Words 0–3 are thereafter transferred into latches 250, 252, 254 and 256 by the active edge of the rank 2 clock signal. This is shown by waveforms 390, 392, 394, and 396, respectively. The rank 2 clock signal is approximately synchronized with the phase 2 clock signal shown as waveform 182 of FIGS. 2 and 4. Word 0 is latched into the output latch 202 on the next active edge of the phase 1 clock signal so that it can be provided to the IP. The contents of the output latch 202 of FIG. 3 are shown as waveform 398. As shown by waveform 398, word 0 is not available in output latch 202 until one clock cycle after it is latched into latch 240, as indicated by arrow 400. As mentioned above, the same delay is incurred during an instruction transfer or the dayclock timestamp transfer. This one clock cycle delay, which is a disadvantage of the prior art circuit, has a substantial impact on system performance. This is especially evident when considering that a processor in the system of the preferred embodiment is capable of executing one instruction every two clock cycles.

Another disadvantage of the prior art buffer 200 is that this circuit requires a fair amount of circuits and silicon area to implement, as discussed above. This is due, in part, to the fact that after the registers within the second rank of latches receive a first transfer of data signals, these registers are not available to receive additional signals until every latch in that second rank has provided the previously received data signals to the output latch. As a result, the latches are not fully utilized, and additional latches are needed to ensure that an overrun condition does not occur.

Figure 5:
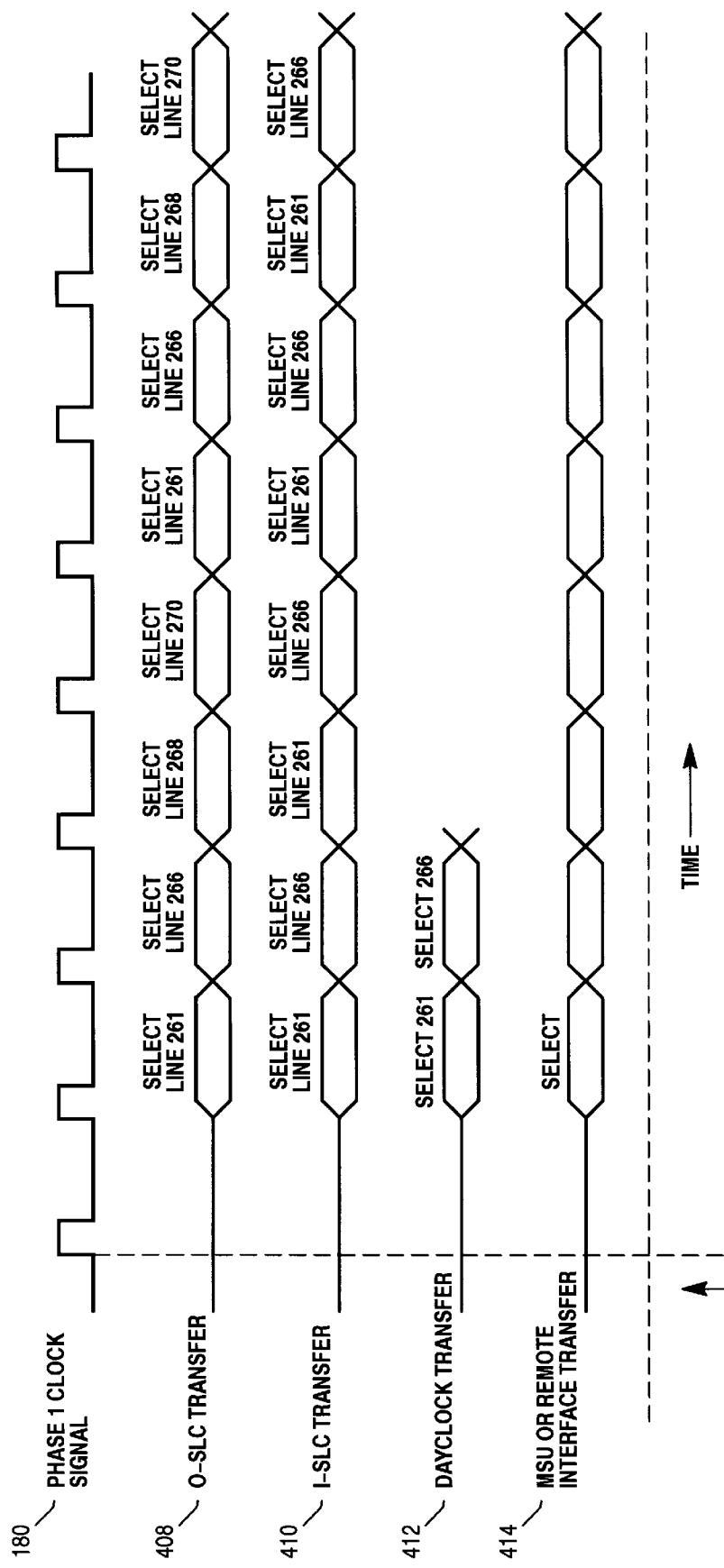
FIG. 5 is a timing diagram of the selection control sequences generated by the output control logic of the prior art speed-matching buffer during transfers between various ones of the transferring devices and an instruction processor.

Another factor that increases the amount of silicon area required to implement the circuit is the relative complexity of the input control logic 226 and the output control logic 258 of FIG. 3, as becomes evident by considering the selection control signals shown in FIG. 5.

FIG. 5 is a timing diagram of the prior art selection control signals shown on line 406 of FIG. 3 during a variety of transfer operations. These control signals are sequenced, meaning the signals present at any given time will depend on which word within a packet of information is being transferred to the IP at that time. In addition, the sequenced control signals are also dependent on the type of transfer that is occurring. This can be seen by examining waveform 408, which shows the control signals which are generated during an eight-word operand transfer from any OSLC segment. The control signals condition selection device 260 to sequentially select the data signals on line 261, 266, 268, and 270, in that order, and to then repeat the cycle. A new selection is made every clock cycle. This results in the selection of word 0, word 1, word 2, and etc., up to word 7, with a different word being selected every clock cycle.

The sequenced control signals are different during an eight-word transfer involving any ISLC segment, as shown by waveform 410. In this case, the control signals on line 406 of FIG. 3 cause selection device 260 to alternately select the words on lines 261 and 266 until eight words have been transferred. The sequenced control signals are similar during a transfer operation involving the dayclock, as shown by waveform 412. During this operation, the control signals on line 406 cause selection device 260 to select inputs from line 261, then from line 266, and only two words are transferred. For any of the transfers from the shared main memory 48, the remote 0/2 interface 122, or the remote 1/3 interface 120 of FIG. 1, the control signals on line 406 select the input 368 sequentially for eight clock cycles, as shown on waveform 414.

As shown by FIG. 5, the output control logic 258 must generate control signals that are dependent on both the type of transfer occurring, and on the specific word in the packet which is being transferred at any given time.

In contrast to the output control logic 258, the input control logic 226 does not have to generate sequences to allow any of the controlled selection circuits to re-select a new group of signals during a transfer. However, the input control logic 226 must condition most selection circuits 218, 220, 222, 224, 310 and 312 prior to every new operation based on the type of transfer to be performed. For example, prior to the transfer of the dayclock timestamp information, selection circuits 218 and 220 must be conditioned to select the words on lines 338 and 340, respectively, and selection circuits 310 and 312 must be conditioned to select the words on lines 350 and 352, respectively. A similar conditioning process occurs prior to a transfer of an instruction packet from one of the ISLCs.

In sum, the input and output control logic is not trivial. The output control logic must generate sequences during most transfers so that the correct word is directed to the output latch 202. The input control logic must condition the associated selection devices based on the type of the transferring device prior to the transfer of each new packet of data signals.

C. Description of the Invention

Figure 6A:
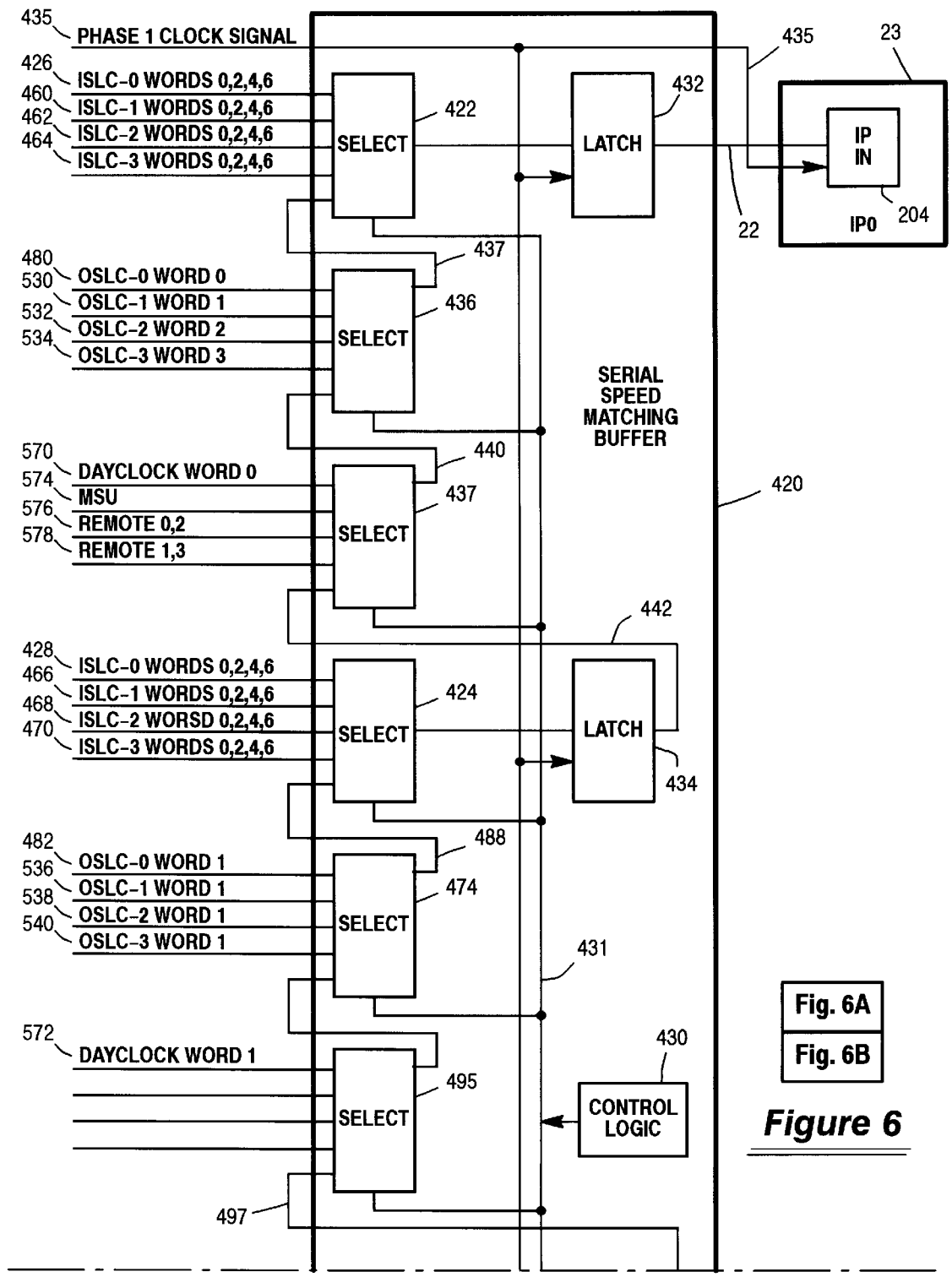
FIG. 6A and 6B, when arranged as shown in FIG. 6, are a schematic diagram of the serial speed-matching buffer of the current invention.
Figure 6B:
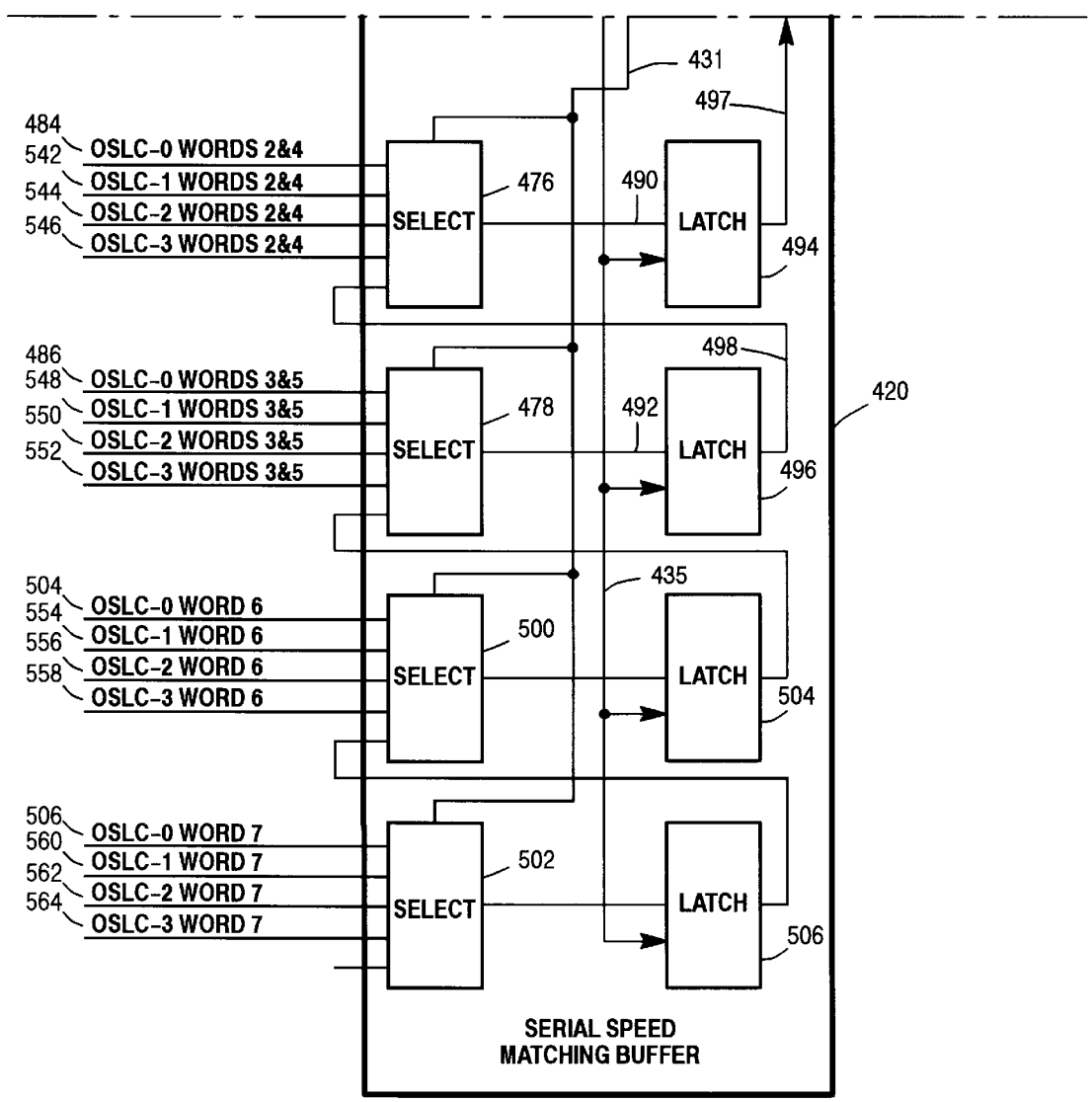

FIG. 6A and 6B, when arranged as shown in FIG. 6, are a schematic diagram of the serial speed-matching buffer 420 which is Applicants' invention. This serial speed-matching buffer eliminates the one clock cycle delay associated with the prior art speed-matching buffer. In addition, the serial speed-matching buffer reduces the number of latches and simplifies the control logic so that the resulting design occupies a smaller area on a custom or semi-custom integrate circuit than does the prior art design. This is important since at least eight such buffers are used within the system of the preferred embodiment, with every processor having an associated speed-matching buffer.

The serial speed-matching buffer has six latches coupled together in a chain configuration. At least one selection circuit is associated with every latch to select the appropriate words to be captured in the latch. Because most selection devices are conditioned to select a set of default input signals, the control logic associated with the serial speed matching buffer is greatly simplified, as will be discussed further below.

The operation of the serial speed-matching buffer 420 is best explained by example. For the following discussion, the serial speed-matching buffer will be described as the speed-matching buffer which is associated with IP0 23 and included within the block 148 of FIG. 1. It will be understood that a similar circuit is associated with every IP in FIG. 1. That is, four such circuits are shown collectively as speed-matching buffers 148, and another four similar circuits are shown collectively as speed-matching buffers 149 of FIG. 1.

Assume an eight-word instruction transfer is occurring from ISLC-0 80 of FIG. 1 to the speed-matching buffer 420 of FIG. 6. Words 0 and 1 are initially provided to selection circuits 422 and 424 respectively on lines 426 and 428, respectively. Selection circuits 422 and 424 are conditioned by control logic 430 on lines 431 to provide words 0 and 1 to latches 432 and 434, respectively, where the words are latched by the active edge of the phase 1 clock signal on line 435. Word 0 in latch 432 is driven onto the interface on line 22 to IP0 23 where it is latched into input latch 204 on the next active edge of the phase 1 clock signal. It may be noted that the first word of the transfer, word 0, is latched into what can be considered an "output" latch because it drives interface 22. Thus, there are no intervening ranks of latches between the transferring unit and the output latch as existed in the prior art speed-matching buffer. Therefore, no time is wasted providing the first word of the transfer to the IP. This eliminates the delay of one clock cycle which was associated with providing the first word of any transfer to the IP using the prior art speed-matching buffer.

After the active edge of the phase 1 clock signal which latched words 0 and 1 into latches 432 and 434, respectively, control logic 430 switches to what can be considered "default" mode. In this mode, each of the selection circuits in the circuit, including selection circuits 422, 436, and 437, are conditioned to select the "serially coupled" input signals, which are shown on lines 438, 440, and 442, respectively. Word 1 is driven onto line 442 by latch 434, where word 1 is selected by selection circuit 437, and is further provided to line 440. The signals on line 440 are selected by selection circuit 436, provided to line 438, selected by selection circuit 422, and finally latched into latch 432 on the next active edge of the phase 1 clock signal. Word 1 is therefore driven onto the interface on line 22 on the clock cycle after word 0 is provided on this interface.

Following the transfer of word 1, the selection circuits 422 and 424 are again conditioned into what can be considered a "load" mode to select the signals on lines 426 and 428, respectively. This allows words 2 and 3 to be latched into latches 432 and 434, respectively, on the next active edge of the phase 1 clock signal on line 435, and word 2 is provided to the interface on line 22. After this load occurs, the selection circuits are again conditioned to the default serial mode and word 3 is provided to IP0 in the same manner discussed above in reference to word 1. This process is repeated for words 4–7.

Figure 7:
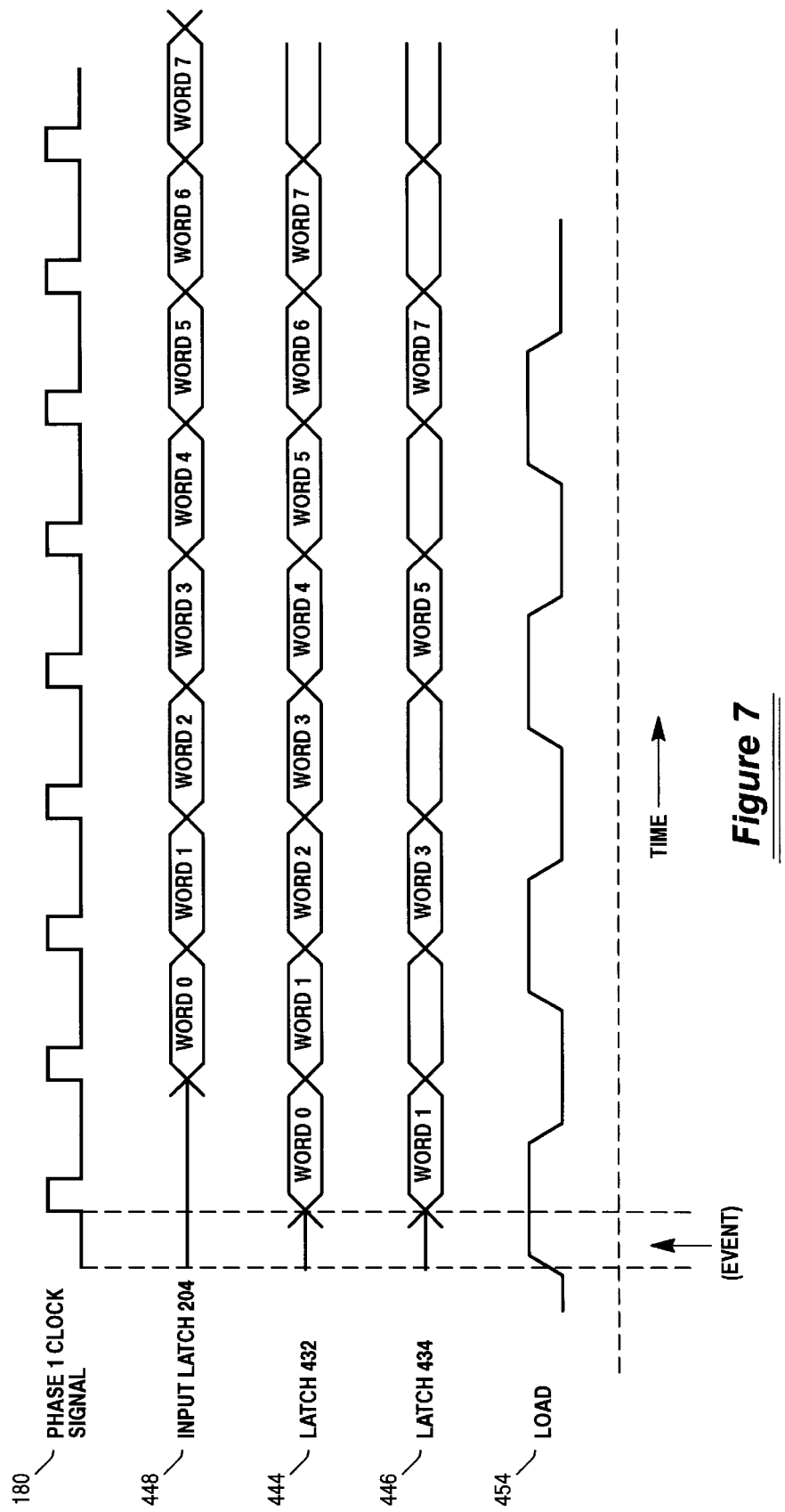
FIG. 7 is a timing diagram showing an eight-word instruction transfer from an instruction second level cache segment to an instruction processor using the serial speed-matching buffer.

FIG. 7 is a timing diagram showing an eight-word instruction transfer from an ISLC segment to an IP using the serial speed-matching buffer. The contents of latches 432, 434, and the IP0 input latch 204 are shown as waveforms 444, 446, and 448, respectively. Waveform 454 shows when the selection circuits 422 and 424 are conditioned to load data. The selection circuits 422 and 424 load data when waveform 454 is shown as a high signal level, and selection circuits 422 and 424 are conditioned in default serial mode when waveform 454 is shown as a low signal level.

The same sequence occurs during any of the other ISLC segment transfers involving segments 1, 2, or 3, except that selection circuits 422 and 440 are conditioned to select signals from the different respective one of the segments during load mode. Namely, during a transfer from ISLC-1, ISLC-2, or ISLC-3, selection circuit 422 selects the signals on line 460, 462, or 464, respectively, and selection circuit 424 selects signals on line 466, 468, or 470, respectively.

An eight-word transfer involving one of the OSLCs results in a sequence of events which is similar to that described above with respect to the ISLCs. Assume, for example, that the first four words of an operand packet are provided by OSLC-0 to the speed matching buffer 420. Words 0, 1, 2, and 3 are presented to selection devices 436, 474, 476 and 478, respectively, on lines 480, 482, 484, and 486, respectively. These selection devices are conditioned by the control logic 430 to provide words 0, 1, 2, and 3 to nets 438, 488, 490, and 492, respectively. All other selection devices, including selection devices 422 and 424, are conditioned in the default serial mode to allow words 0 and 1 to be latched into latches 432 and 434, respectively, on the next active edge of the phase 1 clock signal on line 435. Word 0 is driven onto the interface on line 22. On this same clock edge, words 2 and 3 are latched into latches 494 and 496, respectively, which provide words 2 and 3, respectively, to lines 497 and 498, respectively.

After words 0–3 are loaded into the respective latches, the control logic 430 conditions each of the selection devices 422, 436, 437, 424, 474, 495, and 476 into the default serial mode so that on the next active edge of the phase 1 clock signal, words 1, 2, and 3 are loaded into latches 432, 434, and 394, respectively, and word 1 is provided to the IP.

As discussed above, the OSLCs transfer data signals at the rate of four words per clock cycle on alternating clock cycles. Therefore, during the clock cycle when word 1 is provided to the interface on line 22, OSLC-0 81 will provide four more words to the speed-matching buffer. Words 4, 5, 6, and 7 will be provided to selection circuits 476, 478, 500, and 502, respectively, on lines 484, 486, 504 and 506, respectively. These selection circuits are conditioned to provide words 4, 5, 6, and 7, respectively, from OSLC-0 81 to latches 494, 496, 504, and 506, respectively. These signals are latched on the following active edge of the phase 1 clock signal at the same time words 2 and 3 are latched by latches 432 and 434, respectively.

After words 4–7 are loaded, all selection devices including 422, 436, 437, 424, 474, 495, and 476 are again conditioned to resume default serial mode, and the words are shifted to IP0 23 at the transfer rate of one word per clock cycle in the manner described above.

Figure 8:
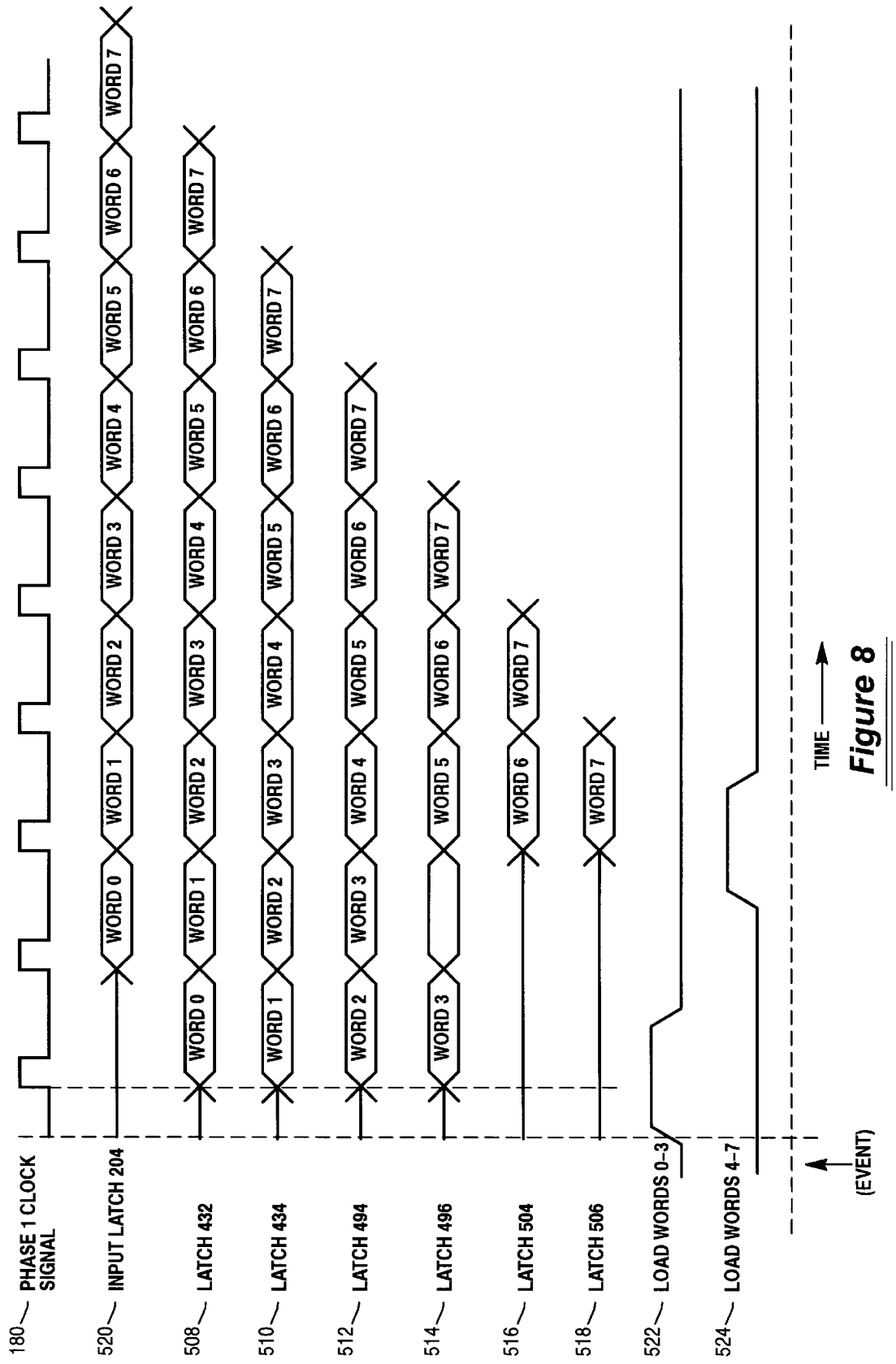
FIG. 8 is a timing diagram showing an eight-word instruction transfer from an operand second level cache segment to an instruction processor using the serial speed-matching buffer.

FIG. 8 is a timing diagram showing an eight-word instruction transfer from an OSLC segment to an IP using the serial speed-matching buffer 420 of FIG. 6. Waveform 180 shows the phase 1 clock signal provided on line 435 of FIG. 6. The contents of latches 432, 434, 494, 496, 504, 506, and the IP0 input latch 204 are shown as waveforms 508, 510, 512, 514, 516, 518, and 520, respectively. Waveforms 522 and 524 show when the selection circuits are conditioned by control logic 430 to load data, as shown by a high signal level, versus the times which the selection circuits are conditioned in default serial mode, as shown by a low signal level. Waveform 522 corresponds to the conditioning of selection circuits 436, 474, 476 and 478 during the first four-word load, and waveform 524 corresponds to the conditioning of selection circuits 476, 478, 500, and 502 during the second four-word load.

The same sequence occurs during a transfer from OSLC-1 81, OSLC-2 83, or OSLC-3 85, except that the selection circuits are conditioned to select signals from the appropriate segment during load mode. Namely, during a transfer from either OSLC-1 81, OSLC-2 83, or OSLC-3 85, selection circuit 436 selects signals on lines 530, 532, or 534, respectively; selection circuit 474 selects signals on lines 536, 538 or 540, respectively; selection circuit 476 selects signals on lines 542, 544, or 546, respectively; selection circuit 478 selects signals on lines 548, 550, or 552, respectively; selection circuit 500 selects signals on lines 554, 556, or 558, respectively; and selection circuit 502 selects signals on lines 560, 562, or 564 respectively.

The transfer of the two-word dayclock timestamp information occurs in a manner similar to a transfer from an ISLC segment. The control logic 430 conditions the selection circuits 437 and 495 to select words 0 and 1, respectively on lines 570 and 572, respectively. All other selection circuits are conditioned to serial mode so that words 0 and 1 are latched into latches 432 and 434, respectively on the next active edge of the phase 1 clock signal on line 435. After these two words are loaded, the control logic 430 reconditions selection circuits 437 and 495 to serial mode so that word 1 can be latched into latch 432 on the following active edge of the phase 1 clock signal.

Finally, during an eight-word transfer from either the shared main memory 54, the remote 0/2 interface 122, or the remote 1/3 interface 120 of FIG. 1, control logic 430 conditions selection circuit 437 to select the signals on lines 574, 576, or 578 respectively. All other selection circuits, including selection circuits 422 and 436, are conditioned in serial mode so that word 0 of the transfer is latched into latch 432 on the next active edge of the clock after the data becomes available. Selection circuit 437 is maintained in load mode throughout the eight-word transfer, since the shared main memory 54, the remote 0/2 interface 122, and the remote 1/3 interface 120 supply data at a rate of one word per clock cycle, which is the same rate IP0 receives the data.

Figure 9:
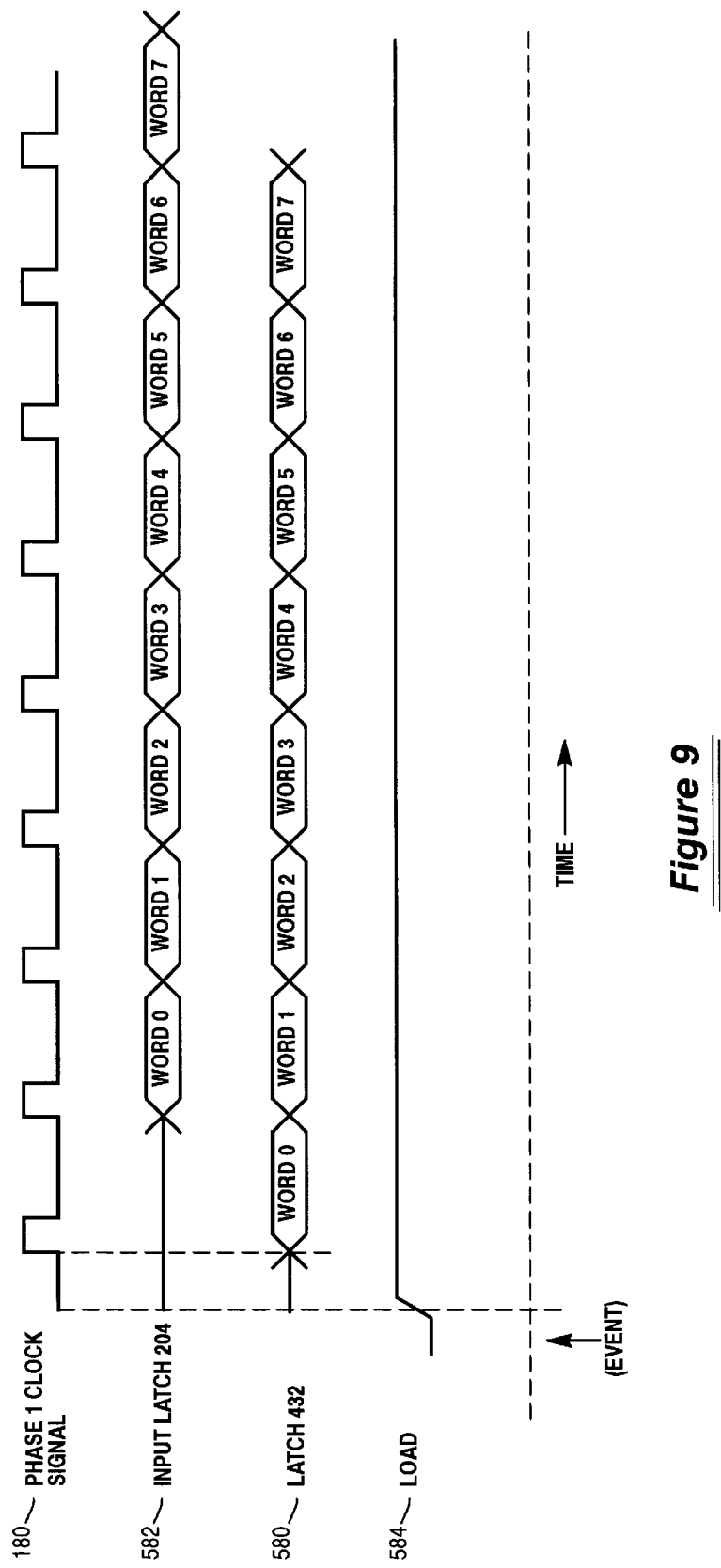
FIG. 9 is a timing diagram showing an eight-word instruction transfer from either a main storage unit, or one of the remote interfaces using the serial speed-matching buffer.

FIG. 9 is a timing diagram showing an eight-word instruction transfer from either the shared main memory 54, or one of the remote interfaces using the serial speed-matching buffer. The contents of latch 432 and the IP0 input latch 204 are shown as waveforms 580 and 582, respectively. Waveform 584 shows that selection circuit 566 is conditioned to load data (shown as a high signal level) throughout the transfer.

As discussed above, the serial speed-matching buffer of FIG. 6 has several important benefits over the prior art circuit shown in FIG. 3. First, data signals latched by a transferring device may be provided to the receiving unit immediately without being latching in multiple ranks of registers. The circuit of FIG. 6 is therefore able to save one clock cycle when providing the first word of any transfer to the receiving IP as compared to the circuit of FIG. 3. This is significant when considering that high-speed data processors such as those of the preferred embodiment are capable of executing one instruction in two clock cycles.

The serial speed-matching buffer of FIG. 6 also contains fewer latches than the prior art circuit shown in FIG. 3. This is primarily due to the fact that within the circuit of FIG. 6, latches are available to receive additional data signals from the transferring unit as soon as previously received data signals are shifted up the register chain to other latches in the circuit. For example, as soon as latch 496 of FIG. 6 provides word 3 of the operand packet to latch 494, it is available to receive word 5 from the transferring OSLC. In contrast, in the circuit of FIG. 3, the second rank of latches is unavailable to receive additional data signals until all captured data signals are provided to the receiving IP. Since in the preferred embodiment at least eight speed-matching buffers are required, and since each of the latches within each speed-matching buffer is 36 bits wide, eliminating several latches per buffer results in a significant saving of circuitry and silicon area.

Finally, the control logic circuits associated with the serial speed-matching buffer is simplified because no logic sequences are required to control any of the selection circuits. Each selection circuit is generally conditioned in a default serial mode to select signals from the adjacent latch in the register chain. When a transferring device provides additional signals to the serial speed-matching buffer, the control logic 430 provides load selection pulses to appropriate selection circuits to allow selection of data signals from the corresponding source. Then the selection circuit again defaults to serial mode. Thus, except during a load situation, the selection signals provided by the control logic 430 are relatively simple, as compared to those required for the prior art circuit.

Having described an exemplary embodiment of the invention in the drawings and accompanying description, those skilled in the art will recognize that various modifications to the exemplary embodiment could be made without departing from the scope and spirit of the claims set forth below:

We claim:

1. In a system having one or more transferring units, each capable of transferring data signals across associated parallel transfer interfaces at an associated transfer rate, the system further having a receiving unit capable of receiving data signals across a parallel receiving interface at a predetermined receiving rate which is different from one or more of the associated transfer rates, a serial speed-matching buffer, comprising:

a selection control circuit to provide input selection control signals for each of the one or more transferring units;

a plurality of registers each coupled to said selection control circuit, each of said plurality of registers coupled to selectably receive data signals from a selectable one of the associated ones of the transferring units at the associated transfer rate in response to said selection control signals, a predetermined output one of said plurality of registers being coupled to the receiving unit;

serial coupling circuits coupling predetermined ones of said plurality of registers to associated different other ones of said plurality of registers to selectably transfer data signals sequentially there between in response to said selection control signals, wherein said predetermined output one of said plurality of registers is coupled to provide the data signals to the receiving unit at the receiving rate in parallel with the sequential transfer of signals between said plurality of registers.

2. The serial speed-matching buffer of claim 1, wherein one or more of said plurality of registers, including said output one, include parallel load circuits to load data signals from a selectable one of the selected associated ones of the transferring units in parallel, and wherein said loaded data signals are provided to the receiving unit substantially immediately upon receipt by said output one of said plurality of registers.

3. The serial speed-matching buffer of claim 2, wherein said selection control circuit includes routing control circuits to allow a selectable one of the one or more transferring units to transfer data signals to a first predetermined subset of said plurality of registers during a first load operation, and to further transfer data signals to a second predetermined subset of said plurality of registers during a second subsequent load operation, wherein said first predetermined subset and said second predetermined subset are not equivalent, and wherein at least one of said plurality of registers in said first predetermined subset is also in said second predetermined subset.

4. The serial speed-matching buffer of claim 1, and further including a default control circuit coupled to each of said plurality of registers to selectively condition each of said plurality of registers into a default serial mode to selectably receive data signals at the predetermined receiving rate from at least an associated other one of said plurality of registers.

5. The serial speed-matching buffer of claim 4, wherein said default control circuit further includes load circuits to condition predetermined selectable ones of said plurality of registers into a load mode to load data signals provided by a selectable one of the associated ones of the transferring units, and wherein said default control circuit conditions said predetermined selectable ones of said plurality of registers to resume said default serial mode when data signals are no longer provided by said selectable one of the associated ones of the transferring units.

6. The serial speed-matching buffer of claim 1, wherein one or more of the associated parallel transfer interfaces are capable of transferring a first number of data signals substantially simultaneously, wherein one or more of the other associated parallel transfer interfaces are capable of transferring a second number of data signals substantially simultaneously, wherein said first number and said second number are different, and wherein said selection control circuits include circuits to generate ones of said input selection control signals to route either said first number of data signals or said second number of data signals to respective selected ones of said plurality of registers.

7. For use in a system having a plurality of transferring units, each transferring unit for providing data signals across an associated transfer interface at an associated transfer rate, the system further having one or more receiving units for receiving data signals across a receiving interface at a receiving rate, a serial speed-matching buffer system comprising:

selection control means for providing input selection control signals for each one of the plurality of transferring units;

a plurality of storage means coupled to said selection control means, for selectively loading data signals during one or more load operations from a selectable one of the plurality of transferring units at the associated transfer rate in response to said input selection control signals; and predetermined serially coupled ones of said plurality of storage means for further selectively loading data signals from respectively associated other ones of said plurality of storage means at the receiving rate, wherein said predetermined serially coupled ones of said storage means are output storage means for providing data signals to the receiving interface at the receiving rate.

8. The serial speed-matching buffer system of claim 7, wherein said selection control means includes loading means for generating ones of said input selection control signals to allow predetermined ones of said plurality of storage means including predetermined ones of said output storage means to be selectably loaded with data signals at substantially the same time from said selectable one of the plurality of transferring units at the associated transfer rate, and wherein one or more of said predetermined serially coupled ones of said output storage means are for providing the data signals to the one or more receiving units substantially immediately upon being selectably loaded.

9. The serial speed-matching buffer system of claim 7, wherein first predetermined ones of said plurality of storage means include first loading means for selectably loading data signals from the selectable one of said plurality of transferring units during a first of said load operations and for selectably loading data signals from said associated other one of said plurality of storage means at the receiving rate during following ones of said one or more load operations, wherein second predetermined ones of said plurality of storage means include second loading means for selectably loading data signals from said selectable one of said plurality of transferring units during said first of said load operations and during predetermined other ones of said following ones of said load operations at the associated transfer rate, and wherein third predetermined ones of said plurality of storage means include third loading means for selectably loading data signals from said selectable one of said plurality of transferring unit during predetermined ones of said following load operations at the associated transfer rate.

10. The serial speed-matching buffer system of claim 7, and wherein said selection control means includes transfer rate selection means for causing each of said plurality of storage means to selectably load signals from said respectively associated other ones of said plurality of storage means at the receiving rate during a default serial mode.

11. The serial speed-matching buffer system of claim 10, wherein said selection means further includes default control means for causing predetermined selectable ones of said plurality of storage means to selectably load data signals at the associated transfer rate from the selectable one of the plurality of transferring units during a load mode and for causing said predetermined selectable ones of said plurality of storage means to resume said default serial mode when data signals are no longer provided by the selectable one of the plurality of transferring units.

12. For use in a system having one or more transferring units each transferring data signals at a respective transferring rate, and further having a receiving unit receiving data signals at a receiving rate, a serial speed-matching buffer, comprising:

a control circuit to provide routing signals;

a plurality of storage devices, each to store data signals received from a selectable one of the transferring units at a respective transferring rate, predetermined ones of said storage devices being output storage devices that are coupled to the receiving unit to provide data to the receiving unit at the receiving rate; and a plurality of coupling circuits each coupled to said control circuit to receive said routing signals, each of said coupling circuits being interconnected to one or more respective adjacent ones of said coupling circuits, each of said coupling circuits being coupled to receive data signals from the one or more transferring units, predetermined ones of said coupling circuits being first coupling circuits each coupled to receive data signals from a respective one of said storage devices, predetermined ones of said coupling circuits being second coupling circuits each coupled to provide data signals to a respective one of said storage devices.

13. The serial speed-matching buffer of claim 12, wherein said control circuit includes first circuits to generate first loading ones of said routing signals prior to a selected one of the one or more transferring units initiating the transfer of data signals, said first loading ones of said routing signals to cause said plurality of coupling circuits to interconnect said selected one of the one or more transferring units to said output storage devices, and whereby said receiving unit receives transferred data signals from said selected one of the one or more transferring units substantially without delay.

14. The serial speed-matching buffer of claim 12, wherein said control circuit includes second circuits to generate shifting ones of said routing signals after a selected one of the one or more transferring units initiates a transfer operation to transfer data signals, said shifting ones of said routing signals to configure predetermined ones of said first and second coupling circuits to allow data signals to be transferred in parallel between respective ones of said storage devices at the receiving rate.

15. The serial speed-matching buffer of claim 14, wherein said second circuits further include second loading circuits to generate second loading ones of said routing signals to configure predetermined ones of said coupling circuits to interconnect said selected one of the one or more transferring units to other ones of said storage devices substantially simultaneously with data signals being transferred in parallel between said respective ones of said storage devices.

16. The serial speed-matching buffer of claim 15, and wherein said selected one of the one or more transferring units transfers data signals to the receiving unit during multiple transfer operations, and wherein said second loading ones of said routing signals are generated to configure predetermined ones of said coupling circuits to interconnect said selected one of the one or more transferring units to different ones of said storage devices during each of said multiple transfer operations.

17. The serial speed-matching buffer of claim 15, wherein the one or more transferring units each transfers a respective predetermined number of data signals during each transfer operation, and wherein said second loading ones of said routing signals are generated to configure predetermined ones of said coupling circuits to interconnect said selected one of the one or more transferring units to a predetermined number of said storage devices based on said respective predetermined number of data signals transferred by said selected one of the one or more transferring units during each transfer operation.

* * * * *